United States Patent [19]
Greshes

[11] Patent Number: 5,630,967
[45] Date of Patent: *May 20, 1997

[54] METHOD AND APPARATUS FOR MAKING LENSES

[76] Inventor: Martin Greshes, 70 Corey La., East Meadow, N.Y. 11554

[*] Notice: The term of this patent shall not extend beyond the expiration date of Pat. No. 5,368,790.

[21] Appl. No.: 343,107

[22] Filed: Nov. 22, 1994

Related U.S. Application Data

[63] Continuation-in-part of Ser. No. 932,088, Aug. 19, 1992, Pat. No. 5,368,970.
[51] Int. Cl.$^6$ .................................................. B29D 11/00
[52] U.S. Cl. .................... 264/2.4; 264/2.7; 264/1.36; 425/174.4; 425/174.8 E; 425/407; 425/808
[58] Field of Search ............................ 264/2.4, 2.7, 296, 264/322, 1.36; 425/808, 174.4, 174.8 R, 174.8 E, 407, 408

[56] References Cited

U.S. PATENT DOCUMENTS

| | | | |
|---|---|---|---|
| 5,032,160 | 7/1991 | Murata et al. | 264/2.7 |
| 5,100,590 | 3/1992 | Ruhlin | 425/808 |
| 5,188,650 | 2/1993 | Nomura | 425/808 |
| 5,368,790 | 11/1994 | Greshes | 264/2.4 |

FOREIGN PATENT DOCUMENTS

| | | | |
|---|---|---|---|
| 62-227730 | 10/1987 | Japan | 425/808 |
| 1-184111 | 7/1989 | Japan | 425/808 |
| 1-316252 | 12/1989 | Japan | 425/808 |

*Primary Examiner*—Mathieu D. Vargot

[57] ABSTRACT

A method for forming a preform mass of thermoplastic material into a lens by compression molding between a pair of molds without the formation of air bubbles or the entrapment of air pockets in the finished lens by preheating the preform mass and molds, and further continuing to apply increased pressure while increasing the temperature or maintaining a predetermined temperature and pressure until the mass has been compressed between the two molds into the shape of a substantially finished lens.

19 Claims, 6 Drawing Sheets

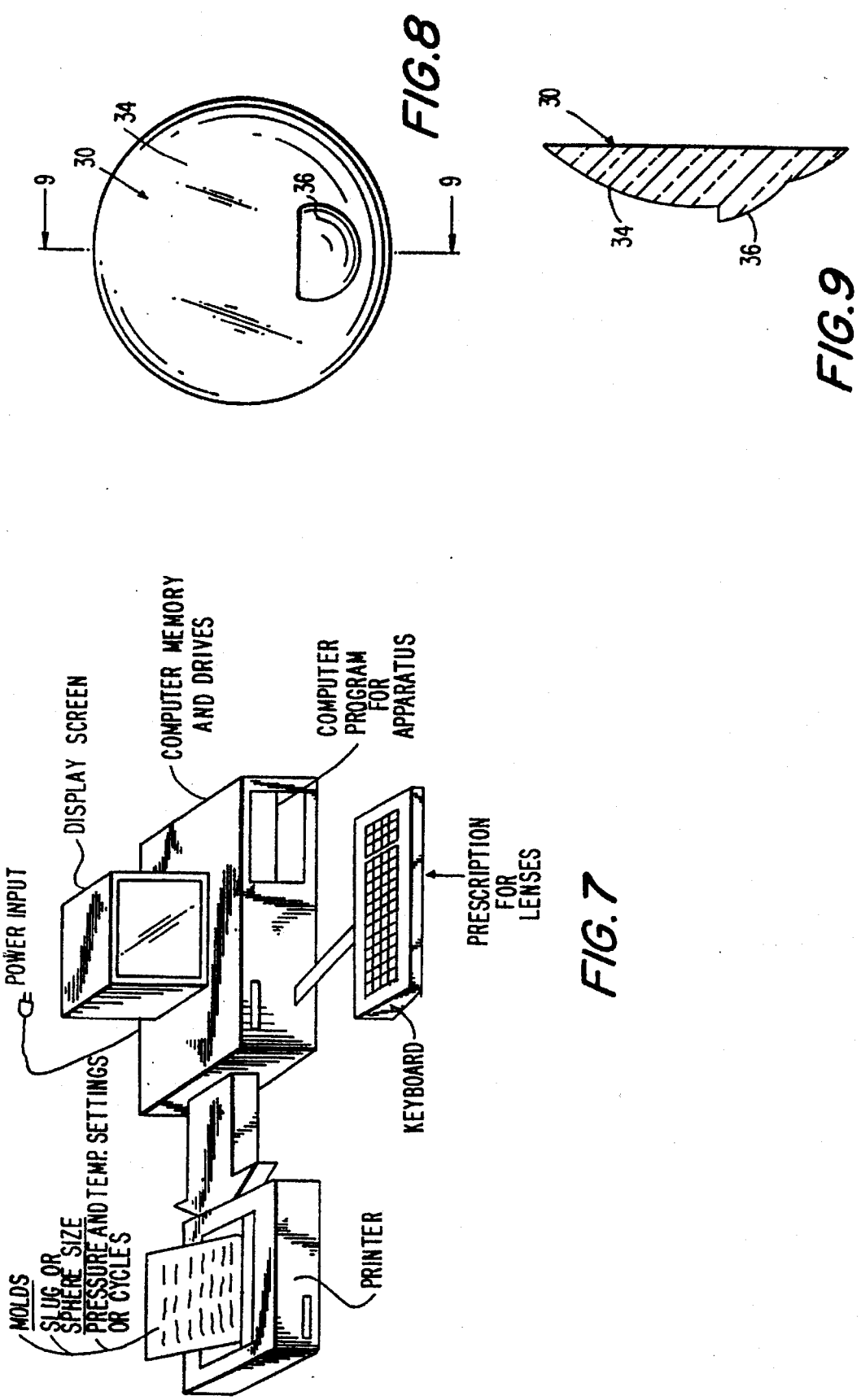

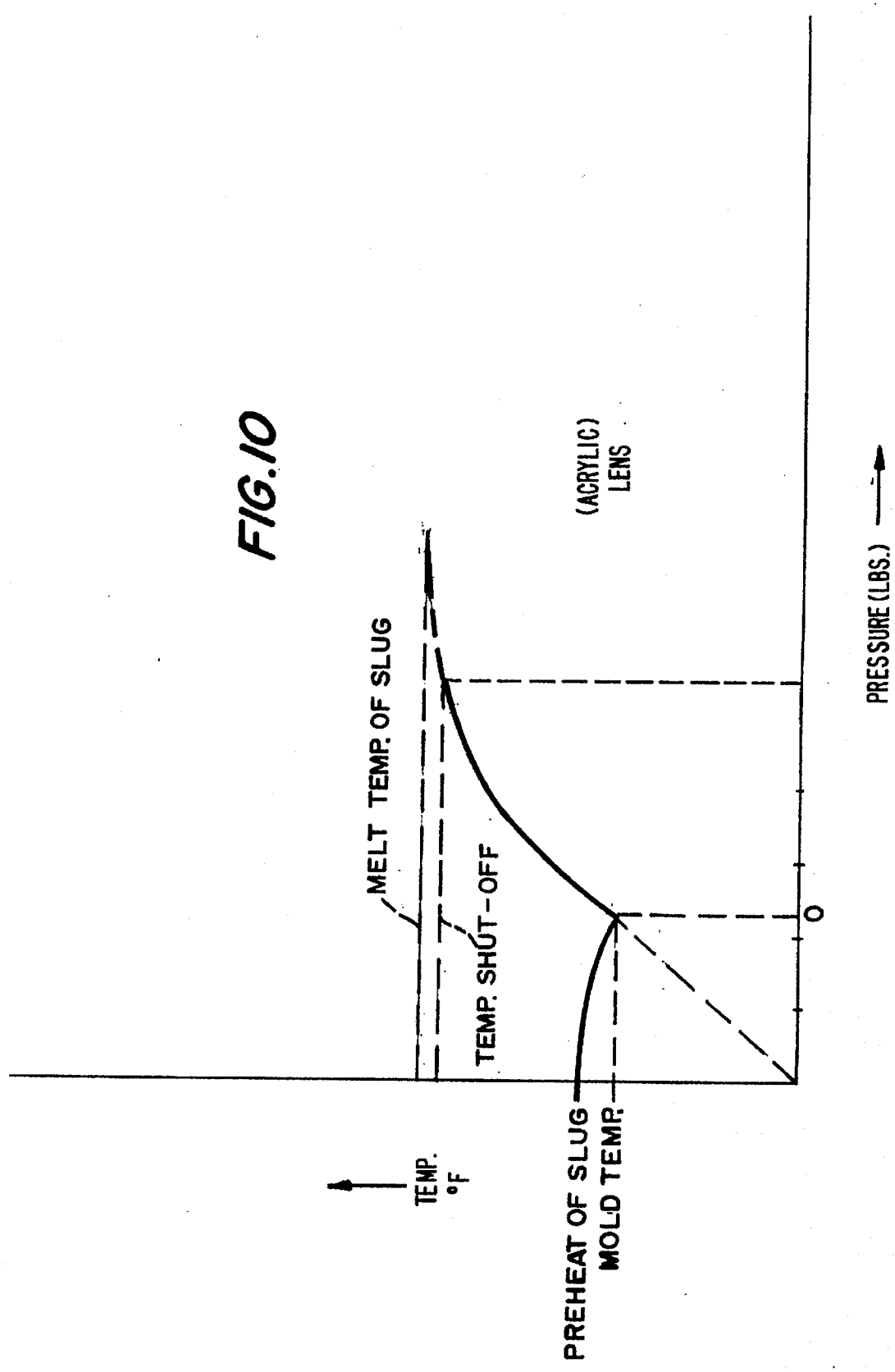

METHOD AND APPARATUS FOR MAKING LENSES

This application is a continuation-in-part of my U.S. patent application Ser. No. 07/932,088; filed Aug. 19, 1992, now U.S. Pat. No. 5,368,970.

BACKGROUND OF THE INVENTION

This invention relates to a method and apparatus for making lenses, and more particularly to a system embodying the cold, compression molding of a lens between a pair of mold/cavities using a monolithic mass of thermoplastic material. The system is particularly applicable for use in house by the optician, optometrist and/or ophthalmologist. The method and apparatus further do not require the use of skilled technicians, and reduces the cost of prescription lenses since they are created substantially defect free, eliminating the need for any middle men, such as a laboratory or lens factory. Moreover, the lens can be fabricated quickly in much less than hour, so that the patient or customer can be fitted with a pair of prescription glasses during the same visit for one's eye examination.

Heretofore in the industry, lenses are traditionally fabricated in a distant wholesale laboratory. A patient or customer has an eye examination, and orders new lenses, he must then return a week or so later to receive and be fitted with a new pair of glasses with the laboratory fabricated lens. This procedure is not only very time consuming, but also expensive. At times errors are made in the prescription. In such cases, yet another visit is required or the lenses must be returned to the laboratory for further corrective measures or an entirely new set of lenses fabricated, with resulting delays and expense.

Within about the last ten years there has been a trend toward development of the so called eyeglass "Super Stores" or "one hour" laboratories. These types of stores are very expensive to run and operate. They require a huge inventory of blanks, and employ highly trained technicians to operate complex lens grinding machines and other finishing apparatuses required to complete all types of prescription lens.

Furthermore, these "Super Stores", to be profitable, require a constant stream of customers as they promote "one hour" service, and generally have highly paid technicians just waiting for orders to keep their machines operating at full capacity.

As a result of this phenomenon, most opticians, optometrists and/or ophthalmologists are losing their customer base and have had their earnings seriously eroded.

More recently, however, there has been an attempt to introduce the "mini-lab" to the optician/optometrist, and/or ophthalmologist. This is a direct attempt to bring in house "one-hour" capability of making lenses directly to the source who fills the prescription lens.

One such organization in this field is Vision Sciences of Monrovia, Calif., who markets an in-office lens casting system employing a choice of resins, such as Master Cast 1.5 clear resin, Master Cast 1.50 with UV protection and Master Cast 1.56 High Index with UV protection. Such a system is capable of casting plastic lens whose styles include single vision, progressive bifocals, flat top 28 or 35 bifocals, Round Seg 28 bifocals, flat top 7×28 bifocals, flat top 7×28 trifocals; and whose base curves are 2, 4, 6 or 8 with lens diameters of 72 mm, 75 mm and 80 mm. This Formalens system is of modular design and embodies a generally large work station incorporating a number of mold storage modules, a resin dispenser, and casting and curing stations. With cure cycles varying from 3 to 16 hours, the customer or patient must usually return a second time to complete his order for new prescription lenses. Such an overnight timetable in reality reduces such "one hour" service to "one day" service at best.

In addition, a deionized, laminar air flow unit is necessary in order to provide a static-free, dust-free area in order to ensure fabrication of clear, sharp spectacle lenses. Such "Method of Choice" plastic lens production systems for office use as marketed by Vision Sciences are known as Model numbers 2001 and 2002 and range in cost from about $27,000 to $63,000, excluding the cost of optional equipment, such as ultrasonic cleaning units and extended range molds that include higher powers and a wider selection of adds.

Such mini-labs are not only very expensive to purchase, but their cost of operation is also costly. In fact, the casting process is laborious since about half of same is "science" and half is "art". As a result, the scrap rate or rate of rejection is very high. This is due to the fact that the optician, optometrist and/or ophthalmologist is not an expert manufacturer, and lacks sufficient skill and training despite the fact that all purchasers of such Formalens System must undergo a lengthy and expensive training program at Vision Sciences' home office in order to be able to properly operate the system. It is so complex it requires a 100 page operator's manual in order to learn how to operate the system. All of these disadvantages have over the last few years brought on a definite need for an improved and better system.

Another similar type lens casting system is marketed by Techna Vision of San Diego, Calif., but this company is no longer believed to be in business. It is believed that the casting systems developed by both Techna Vision and Vision Sciences involved considerable difficulty due to the complexities of the casting systems employed. The experiences have been negative and, in reality, failures.

Other prior art systems are shown and discussed in the body of the present patent application.

OBJECTS OF THE INVENTION

It is the primary object of the present invention to provide a novel method and apparatus for the manufacture of ophthalmic lenses.

It is yet another object of the present invention to provide a more simplified, and less expensive means of fabricating relatively expensive lenses, such as multifocal lenses in house in the shortest possible time so as to eliminate the need for a customer to return a second time to the optician, optometrist and/or ophthalmologist's office.

A still further object of the present invention is to provide an improved novel method and apparatus of cold flowing and/or compression molding a monolithic mass of thermoplastic material into a lens virtually within minutes, so that one can obtain a pair of prescription glasses in a single, relatively short visit to the optometrist, optician and/or ophalmologist.

SUMMARY OF THE INVENTION

In summary, the invention pertains to an improved method and apparatus for making thermoplastic lens by first placing a pair of lens molds in a press; then positioning a preheated preform of thermoplastic lens material having been heated to its softening point while still retaining its original shape on one of the molds which may also have been preheated to about a temperature at which said preform is softened; thereafter closing the lens molds and pressing the molds toward each other and against said preform to immediately "mash" down the preform to about ⅓ to ½ of its size while continuing to heat the molds and increasing and/or maintaining the pressure thereon until the preform softens and the pressure is sufficient to totally compress the preform to its final lens form. By continuing to heat the pair of molds to a temperature sufficient to soften and form the preform, but not melt it, while at the same time maintaining pressure, the preform is transformed by compression into a lens shaped by the pair of molds. Lastly, the molds are suitably cooled, while the pressure reached or utilized to compression mold the lens is substantially maintained until the lens is released from the molds. Any pressure capable of compression molding the preheated preform to a desired semi-finished lens may be utilized in the practice of the invention.

BRIEF DESCRIPTION OF THE DRAWINGS

The foregoing and other objects, features and advantages of the present invention will become readily apparent to those skilled in the art from a reading of the detailed description hereafter when considered in conjunction with the accompanying drawings wherein:

FIG. 7 is a flow diagram illustrating my method of making the lens;

FIG. 8 is a typical lens (bifocal) made in accordance with the invention;

FIG. 9 is a cross-sectional view of the lens of FIG. 7, taken along the section line 8—8 of FIG. 7;

FIG. 10 is a graph of temperature versus pressure for a typical acrylic material used in a lens in accordance with the present invention.

DETAILED DESCRIPTION OF THE PREFERRED EMBODIMENTS

Figure 1:
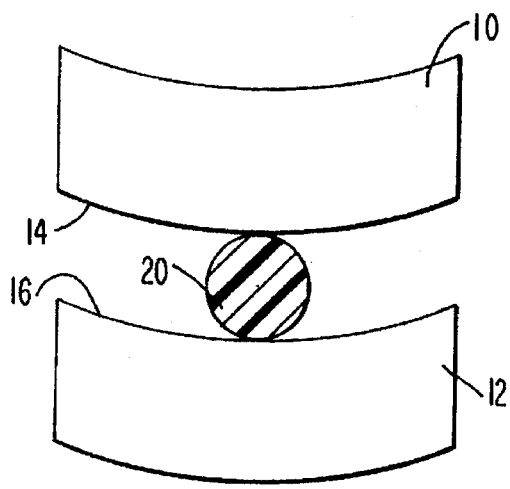
FIGS. 1–3 are vertical sectional views showing a typical pair of molds for use with my new and improved method and apparatus for forming finished multi-focal ophthalmic lenses from a preform of plastic lens material in the form of a slug or sphere of moldable plastic.
Figure 2:
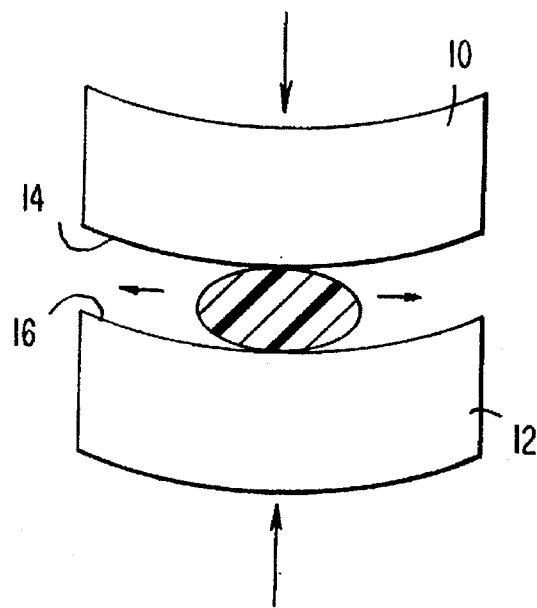
Figure 3:
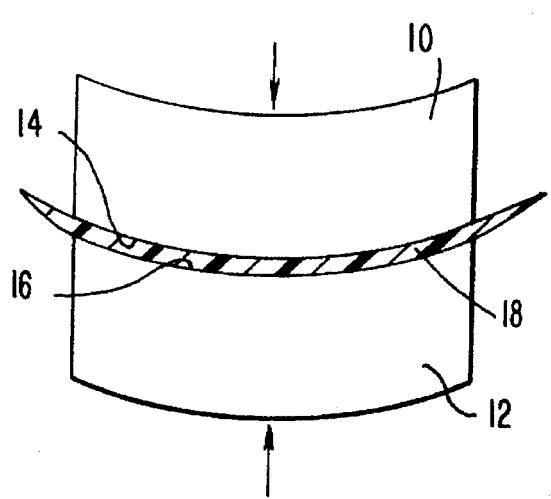
Figure 4:
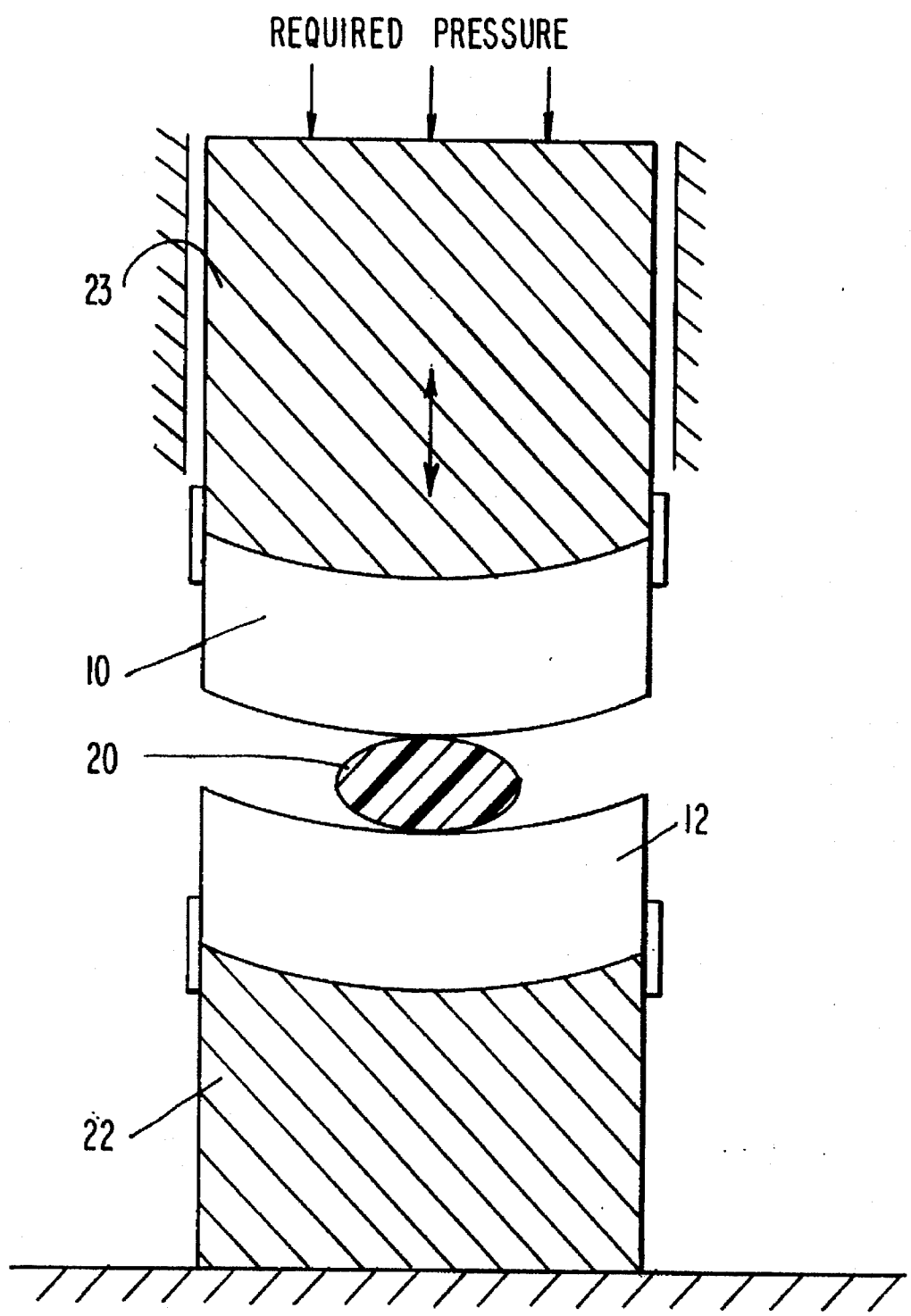
FIG. 4 is a vertical sectional view of my new and novel apparatus for forming the ophthalmic lens.
Figure 5:
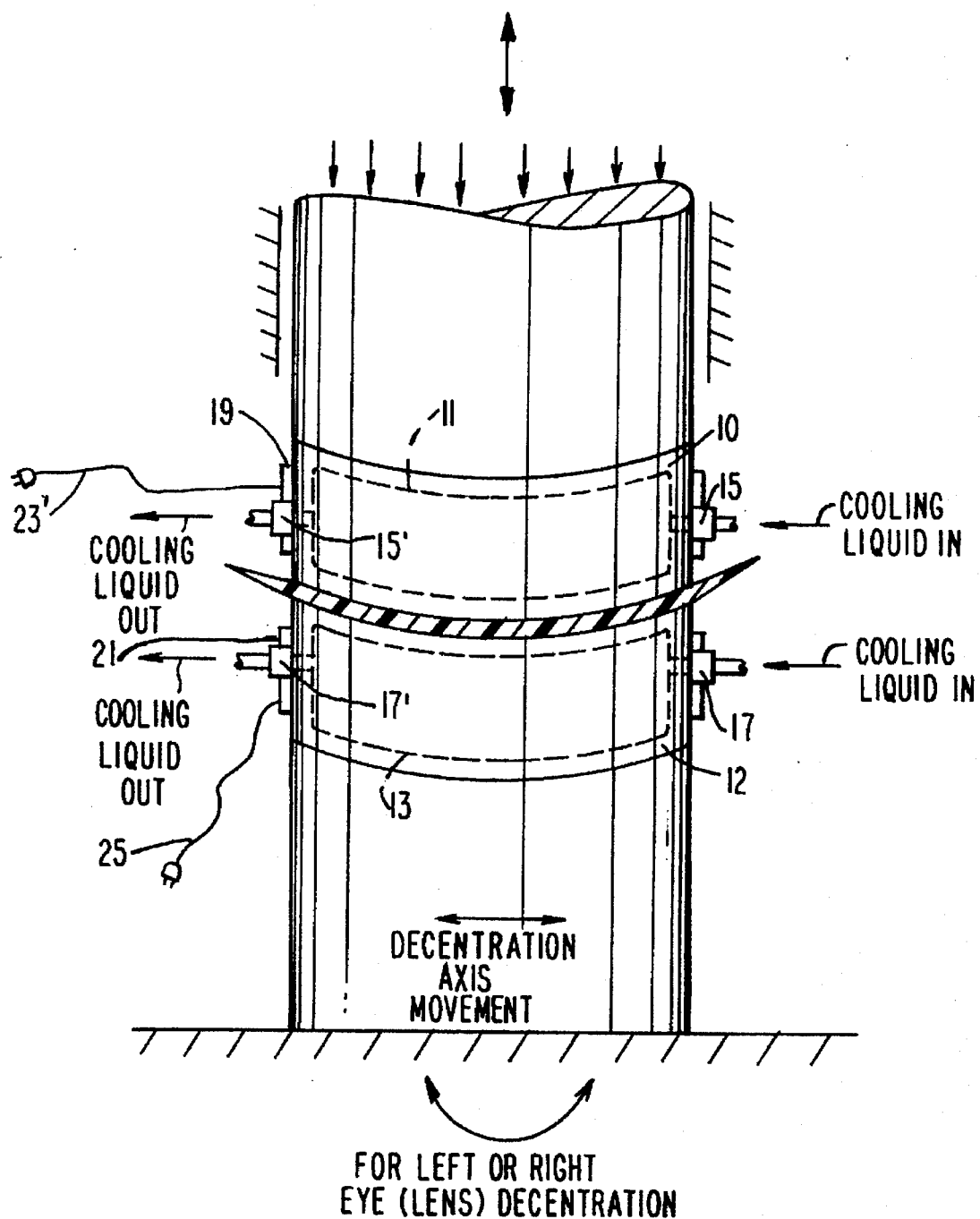
FIG. 5 is a more detailed elevational view of the molds shown in FIGS. 1–4.

Referring now to the drawings, and in particular to FIGS. 1–5, there is shown my novel method and apparatus for making prescription lens. As shown therein, a lens is made from a pair of predetermined molds (top 10 and bottom 12) having on their surfaces 14 and 16 the desired curves for the opposite sides of the finished lens 18. The lens 18 is preferably formed from a single, monolithic preform, pellet or slug (sphere) of plastic lens material 20, and preferably of a thermoplastic resin material, such as polymethyl/methacrylate, polycarbonates, polystyrenes, cellulose acetate, acrylic copolymers, thermoplastic polyesters, styrene acrylonitrile (SAN), and/or mixtures thereof. Suitable specific thermoplastic materials of such resins and their U.S. trademark names are for the polycarbonates, Lexan and Makrolon, respectively, made and sold by G.E. Plastics of Pittsfield Mass. and Mobay Corp. of Pittsburgh, Pa.; for the acrylics, Plexiglass and Acrycal, respectively, made and sold by Rohm & Haas of Philadelphia, Pa. and Continental Polymers of Compton, Calif.; and for the cellulose acetate, Tenite made and sold by Eastman Chemicals Inc. of Kingsport, Tenn. The edging of the lens 18 may be suitably finished by special edging equipment and the finished lens may then, if desired, be suitably treated with one or more coatings, such as a scratch resistant coating and/or suitably tinted or dyed to produce prescription sunglasses. With the method and apparatus of the invention, the lens can be fabricated from other suitable lens materials, so long as the material is a thermoplastic in contrast to that of a thermosetting material. As shown in FIGS. 4 and 5, the bottom mold 12 is suitably secured to and seated on the lower mold support 22, whereas the upper mold 14 is suitably secured and seated with respect to the ram or piston 23, and they perform the compression molding and pressing of the slug/sphere or preform 20 of plastic material into the desired shaped lens formed by the two mold halves. Mold halves may be changed manually or suitably automatically, and one may position the preform on the bottom mold 12 when a lens, such as 30 (see FIG. 8) is to be fabricated.

The molds 10 and 12 have hollow cavities 11 and 13 and are suitably cooled, preferably by water entering inlets 15 and 17 and exiting outlets 15' and 17' after a lens is formed by the molds. Other cooling means, such as by flowing fresh air over the molds may be employed if desired although such means requires more time to cool the molds and lens to room temperature. Cooling of the molds whether by water or air is important as the lens 18 may not be released safely and clearly from the molds 12 and 14 without such cooling operation. In addition, the molds 10 and 12 are further heated by means of electric heating bands 19 and 21 wrapped about the molds 10 and 12 and are suitably connected electrically by means of power cords or lines 23 and 25 to a suitable power source which is controlled by a computer program for operating the apparatus.

Lenses produced by the method and apparatus of the invention require no further finishing operations, other than an edge treatment to remove any flashing, and the application of one or more surface coatings, such as a hard surface coating, and or a tinting treatment.

Figure 6:
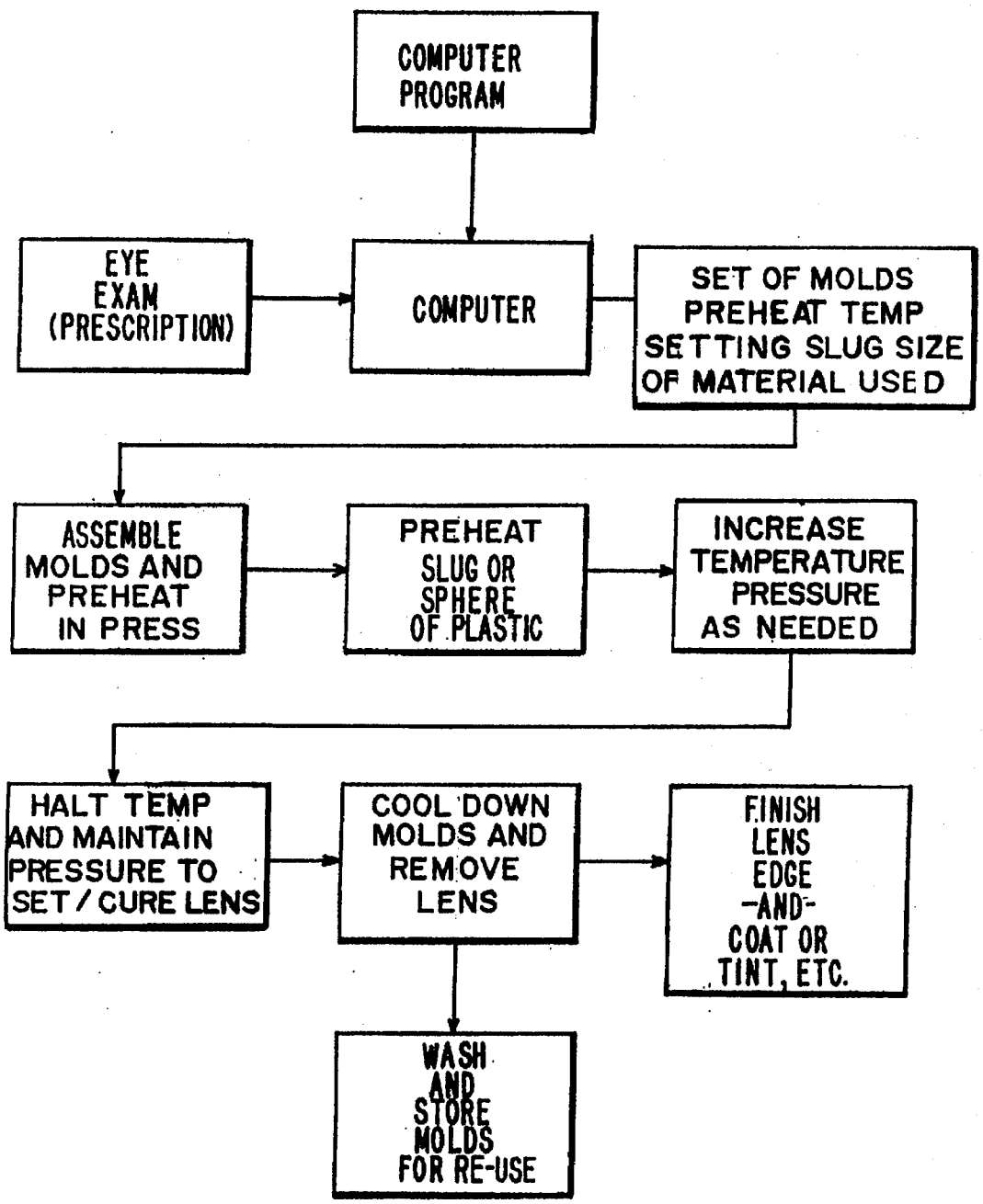
FIG. 6 is a work station with computer, keyboard, printer and display screen for providing a set of instructions to the operator for making a predetermined lens in accordance with a computer program designed to operate the lens making apparatus of the invention.

In FIGS. 6 and 7, there is shown a typical computer work station for use with the apparatus of the invention. With the use of conventional or predetermined mold parts for making a prescription lens with a standardized program of referencing corrective lenses and their various machine settings, as well as decentration or prism/wedge effect (movement of optical center from geometric center), on the apparatus of the invention, the user can select the desired slug/sphere or preform of given weight, and with the mold halves offset or located to achieve any desired decentration.

Thus, one can achieve the resulting ophthalmological lens output shown in the flow chart of FIG. 7 for just about any type of corrective lens, be it a bifocal, trifocal, or other type of corrective lens. The flow chart of FIG. 7 is self-explanatory and illustrates the various operative steps used in the method and apparatus of the invention.

The lenses are formed without any entrapped air bubbles due to the compression molding of the thermoplastic slug/sphere, and the lens fabricated can be immediately assembled (after an edge removal step) into a frame for the patient without the need to set up a return date so that the finished lens may be inserted in an eyeglass frame.

It is important with the improved method and apparatus of the invention to utilize a moldable thermoplastic material which can be heated and squeezed into the required shape. On average, a typical lens made by the improved method and apparatus of the invention can be made in a very short time, i.e. time is reduced by about 90% as compared to the one-half to one hour presently required when a lens is made in accordance with the teachings of my parent copending patent application.

It should be recognized that almost any type of lens can be fabricated by the improved method and apparatus of the invention, provided that prescription lens molds are in stock and form part of one's mold inventory. In this regard, the front and back molds form a set for any desired lens configuration or prescription as well as lens size, (i.e. 75 mm diameter). Generally, one would employ molds with diopter power increments of 0.25 (plus or minus) so that all prescriptions can be covered with the front and rear mold set configurations. The combinations of mold sets should cover substantially all standard or routine prescriptions, including multifocals, such as bifocal and trifocal, round, single vision, etc. (for example, bifocals have various base curves, with bifocal reading segments of different sizes and shapes, and many segment curves for the bifocal additions).

The molds may be made of highly tempered glass, or preferably, of metal. They contain curves of different radii ground and polished into their smooth optical surfaces. Both molds should be of the same material. In addition, the different curves or radii in a surface produce the corrective "power" to the finished lens formed by a mold set, (be it a bifocal or trifocal, etc.). The edges remain unfinished and must be trimmed or ground down to the lens diameter or size required to fit a frame. Also, the two molds are suitably spaced apart according to the edge thickness desired. There is no need for any type of gasketing means to stop any flow of material from slipping out from between the molds, as is required in casting of lens using well-known conventional processes.

The lenses made by the present invention are compression molded and suitable calibrating means which are well-known to those skilled in the art are used to form whatever decentration the lens is required to have along with the desired optical quality surfaces and powers prescribed. Once a lenes is fabricated and removed from the apparatus of the invention, only the edge need be removed, and this can be done after tinting and/or a hardness coating is applied. With the improved method and apparatus of the invention, grinding and polishing of the optical surfaces is eliminated.

During the method of compression forming the lens, no air bubbles of any kind are formed in the lens. Any such lens would be defective if it included air bubbles. The preheating and subsequent continued heating steps are necessary to soften the pellet or slug (preform), and such heating are performed by a suitable oven and the moldheating bands 19 and 21, respectively. The compression molding forms the lens without the formation of air bubbles in the lens.

Other suitable mold heating means may also be employed in the apparatus of the invention such as electrical coils or conduction heaters built into the molds as well as dielectrically pre-heating of the sphere and/or molds.

The apparatus of the invention comprises a conventional type of computer program, embodying known software designed to specify by calculation and computation stock molds or sets of molds necessary to form a prescribed lens prescription which the user enters into the computer by keyboard or other input means. The output of the computer specifies in addition to the molds required, preform size or weight of the pellet, preform or sphere, and if desired, the compression molding and cool down time periods. The preform preheating temperature may also be specified as well as the temperature of the molds at the time of commencing compression of the preform in the mold press. Accordingly, as will be understood by those skilled in the art, one may also manually meet the prescription requirements of the molds, slug/sphere weight or size, settings of the apparatus, etc. by predetermined calculations and using suitable charts showing the values required. Such information and/or data could then be alternatively manually entered into the molding apparatus along with the particular molds required, in lieu of an automatic setting, including suitable means for retrieving the specified molds and positioning and suitably securing them directly on the mold support (for the bottom mold) and on the ram or piston (for the top mold). Such an automatic arrangement is shown for convenience in the block diagram of FIG. 6 which is illustrative of the various steps involved in the improved process or method of the invention. The "weight" of the preform is a function of lens size thickness and prescription, whereas pressure and heat or temperature required to mold the lens is primarily a function of the lens material. For example, the weight of a Plano lens (no correction needed) 65 mm in diameter and 0.175" thick is 15 grams so preform weight would be slightly larger to insure full mold coverage and adequate flash about the entire lens periphery (the flash serving to grip the lens for further treatment, such as coatings, tinting, prior to its removal).

A typical lens capable of being fabricated by the method and apparatus of the invention is shown in FIGS. 8 and 9. As illustrated therein, the lens 30 is comprised of areas 34 and 36. Area 34 is the major surface for distance viewing and minor surface 36 of the bifocal lens is formed to the curvature desired for near viewing or the reading portion of the lens.

Typically, for generally any given lens prescription, manual computations using industry prescribed charts or desirably computer program calculations can be specified for identifying what stock molds are to be retrieved from storage, and used to fabricate the lens prescription in the apparatus of the invention. In addition, preform weight and/or size is identified and the material may be suitably specified as well or simply chosen by the patient an/or his or her doctor, etc. Also, mold cycle time including temperature and pressure settings are specified for the compression molding of a lens, as well as the cool down cycle time.

In operation, the molds are initially checked for scratches or any other imperfections or faults, as they must be clean and exhibit highly polished surfaces and set-up in the apparatus. A preform or sphere of the lens material is first preheated to a temperature just below its softening point, then the preform which still has its original shape is placed or positioned mechanically on the bottom mold, and the sphere or other preform used must make preferably either a point or other "centerline" contact with the mold halves so as to ensure a compression flow path which eliminates air bubbles or pockets of air trapped in the finished lens. Such shaped preform as will be explained hereinafter ensures that there can be no entrapped gases or air in the compression molded lens. then, pressure is continuously applied and maintained on the preheated sphere or preform while the preform temperature is also continued and maintained. Thus, for example, when making a lens using an acrylic material, the pressure reached may be as high as about 1500 pounds. Simultaneously therewith, the molds were preheated to a like temperature from room temperature to about the temperature of the preform. In the case of an acrylic material as the preform or sphere begins to soften at 240 degrees F. and at a maximum temperature of about 280 degrees F., the preform is thus initially preheated to a temperature which does not melt the preform, but which is just below the softening range. In this way, the preform can be handled for transfer to the molds, at which time there is a slight dip in temperature due to the transfer operation. It should be noted that the pressure utilized need only be sufficient to compress the preform once it reaches its softening point and begins to flatten out totally to take the shape of the mold halves. In fact, once the softening point is reached, the pressure required to form the lens is minimized.

Note that prior to the compression molding, decentration (prism or wedge effect) required would then be made by suitable conventional means (not shown) which would move the opticial center of the lens from the geometric center. Such known means either moves one mold axis with respect to the other mold axis or cocks one mold on a desired slight angle (slant or wedge) to achieve the same decentration effect.

As shown in FIG. 10, which represents a typical temperature-pressure graph of a lens material used in fabricating a lens employing the improved method and apparatus of the invention. As shown therein, once the preform is preheated to a temperature just below the softening point, for example, of an acrylic preform, the molds having then also been preheated up to about the same temperature, the sphere or preform is further softened by continued increase in pressure and temperature, until the pressure drops off due to complete softening of the thermoplastic lens material (sphere). The apparatus is programmed to maintain such pressure value reached, and the temperature is maintained and/or increased also until the partially deformed sphere continues to deform totally. The process is maintained until finally the preform or sphere is compression molded into a lens formed between the top and bottom molds, at which time heating is stopped and the molds are cooled. Once the lens is formed and the molds are "closed" (although they may not physically touch or "kiss" each other), the pressure observed on a gauge (not shown) of the apparatus is at a maximum value where once the preform is totally squeezed down to a shaped finished lens in the molds at which time the heating means is closed down or turned off. The molds are then suitably cooled by a flow of water to the mold cavities or air may be suitably blown over the molds by fan means. However, the pressure is maintained at all times to preclude shrinkage, and once the molds and lenses are sufficiently cooled so the molds can be parted or opened to enable access and removal of the lens, the cooling water is shut down. The compression molded lens once removed is then ready for any coatings, tinting, etc. and a final edge removal operation may be conventionally done by grinding. The finished lens is thereafter checked for optical characteristics and then can be mounted in an eyeglass frame. While the process could be carried out anywhere along the solid upwardly sloped curve of FIG. 10, ideally making a lens at about the shut off temperature and pressure enables a semi-finished lens to be made in the shortest possible time, i.e. about less than a few minutes.

With the improved method and apparatus of the present invention, there is no air entrapped in the resin as a specific shaped monolithic preform is employed. Also, no walled mold is needed as the preform of the present invention is not liquified nor is the material plasticized in any was as is the case with the prior art method and apparatuses as described and shown in FIGS. 11A and B and 12A and B of my copending parent patent application. In fact, to do so would defeat the purpose of the invention and melted material would shoot out from between the molds and/or cause air to start to become entrapped in the liquid mass. Bear in mind that melting and/or plasticizing of any resin material causes the melt which is under tremendous pressure to squirt and leak out of the molds. Such problems are ever present in such prior art system as it is very analogous to the conventional injection molding system of molding plastic parts.

From the foregoing, it can be seen that an improved method and apparatus for making lens is provided whereby prescriptive and/or design requirements for most, if not all, ophthalmic and other plastic multifocal lenses encountered in the field may be produced simply and inexpensively with exceptional precision and efficiency by theoptometrist and/ or ophthalmologist. This is attributable to the present novel system for producing lens from stock molds, and which system avoids the need for a high degree of technical knowledge and skill in the operation of the method and apparatus of the invention. It should also be appreciated that the improved method and/or apparatus of the invention may be applicable to other types of lenses, such as those used in scientific equipment or in other optical devices.

Thus, so long as the material for such lenses are thermoplastic and capable of compression molding without degradation, it would appear practicable to use the improved method and apparatus using special molds to fabricate such lenses by the improved method and apparatus of the invention. For example, using a polycarbonate lens material, and without preheating the preform, it took about 28 minutes to fabricate a lens. On the other hand, if the preform was preheated to almost 305 degrees F., and then placed in the mold, a semi-finished lens could be made in about one minute. Moreover, if the preform was preheated to almost 325 degrees, the fabrication is virtually instantaneous as the molds clamp closed in virtually no time. Here, however, the preform is somewhat too soft for handling and should be avoided.

The shape of the monolithic preform is important for a number of reasons. First, and foremost of all, the preform should be of a shape which totally eliminates any chance of air bubbles becoming entrapped in the lens during the compression molding of same. In addition, the larger the "spread out" area of the preform one initially starts with after the preheated preform is initially compressed by the molds, the faster the preform is finally molded into a semi-finished lens as movement of the mass of material is less and the heat transfer is fastest through the shorter distances of a "spread out" preform. Moreover, with a preheated preform, the preform is smashed down at a very fast rate and this also contributes to faster heat distribution as point or line contact quickly becomes almost full mold surface contact. A preferred preform shape for use with the invention is a double convex form of blank. Another preferred blank form is a hemisphere; and additionally a sphere may be employed in the practice of the invention, but this blank form requires maximum movement of the mass of material forming the preform and takes considerably longer in transferring the heat throughout the spherical shape of the preform during the preheating stage. In contrast thereto, lens blanks used today with conventional processes of grinding the lens surfaces essentially all have a concave-convex form. Such a form could not be employed in the practice of the present invention as the concave shape lends itself to entrapping air in pockets as the lens is formed between the molds. Moreover, most prior art lens blanks are made of thermosetting materials which cannot be compression molded upon heating. Accordingly, with the improved novel method and apparatus of the invention, the preform or "Universal" preform is made of a thermoplastic material, and it must always have smaller radii than that of any concave molds used to make a lens with the compression system of the invention.

Although the present invention has been described in some detail by way of illustration and example of purposes of clarity and understanding, it will, of course, be understood that various changes and modifications may be made with the form, details, and arrangements of the parts without departing from the scope of the inventions as set forth in the following claims.

What is claimed is:

1. An improved method for the rapid on-site making of a lens in a few minutes from thermoplastic material comprising the steps of:
   a. placing a pair of lens molds in a press, having no need for any type of gasketing means disposed about said pair of molds and preheating said molds, to an elevated temperature;
   b. preheating a monolithic preform mass having radii to a temperature below the softening temperature of said thermoplastic material;
   c. positioning said preheated preform between said molds such that the radii make point or line contact with each of said molds for precluding the entrapment of air pockets and the formation of air bubbles in a formed lens;
   d. closing and pressing said pair of molds toward each other and against said preform mass so as to mash down said preheated preform to at least about one-third to about one-half its original size;
   e. continuing to heat up said pair of molds until said preform mass reaches a temperature at which said preform further softens and is almost generally flattened out between said pair of molds;
   f. maintaining said temperature and maintaining pressure on said pair of molds until said preform mass is reconfigured and/or transformed by compression molding into a lens defined by said pair of molds with any excess preform material ended from between said pair of molds; and
   g. terminating the heating of said pair of molds and thereafter removing a formed lens from said pair of molds.

2. The method according to claim 1, including the step of cooling said pair of molds.

3. A method of fabricating an ophthalmic quality lens, comprising the steps of compression molding in a press, a preheated monolithic preform mass of a thermoplastic material between a preheated pair of molds having predetermined arcuate and substantially matingly configured surfaces therebetween; and said press having no need for any type of gasketing means disposed about said pair of molds; and said preform mass having radii for making a point or line contact with each of said molds so as to preclude the entrapment of air pockets and formation of air bubbles in a formed lens; maintaining an increasing pressure on said preform mass with a pressure not exceeding about 1500 pounds while heating continuously said preform mass at air increasing temperature but below the melting point thereof until said preform mass reaches a temperature at which said preform is fully compression molded into said lens by said substantially matingly configured surfaces of said pair of molds with any excess preform material exuded from between said pair of molds, whereby said lens is molded in just a few minutes.

4. The method in accordance with claim 3, wherein said arcuate and substantially matingly configured surfaces have a convex-concave relationship.

5. The method in accordance with claim 3, wherein said preform mass of thermoplastic material has a predominately double convex configuration.

6. The method in accordance with claim 3, wherein said preform mass of thermoplastic material has a substantially hemispherical configuration.

7. The method in accordance with claim 3, wherein said preform mass of thermoplastic material has a substantially spherical configuration.

8. The method in accordance with claim 3, wherein said preform mass of thermoplastic material is selected from the group consisting of polycarbonates, polystyrenes, cellulose acetate, acrylic copolymers, thermoplastic polyesters, and mixtures thereof.

9. The method in accordance with claim 8, wherein said preform mass is an acrylic copolymer and said pressure is in the range of from about 1000 psi to about 1500 psi.

10. The method in accordance with claim 9, wherein the maximum temperature employed is approximately 280 degrees F.

11. The method in accordance with claim 3, including the step of cooling said pair of molds.

12. An apparatus for the rapid on-site making of a lens in a few minutes, comprising:

heating means for applying heat in a continuous manner to a pair of molds mounted in a press, having no need for any type of gasketing means disposed about said pair of molds, with said molds having predetermined shaped cavities, positioned in said apparatus;

means for loading a monolithic preform of thermoplastic lens material on one of said molds; and said preform having radii for making a point or line contact with each of said molds so as to preclude the entrapment of air pockets and the formation of air bubbles in a formed lens;

means for pressing said molds in said press toward each other and against said preform so as to smash down said preform with a pressure not exceeding about 1500 pounds while continuing to apply heat to said pair of molds at an increasing temperature until said preform reaches a temperature at which said preform further softens and substantially flattens out in said molds with any excess preform material exuded from between said pair of molds; and means maintaining pressure on said pair of molds during the continuation of the application of heat to said pair of molds and means for stopping said heating when said lens is fully formed while maintaining pressure.

13. The apparatus according to claim 12, including means for cooling said pair of molds.

14. The apparatus according to claim 13, wherein said means for cooling said pair of molds is by convection means using a liquid flowing through said pair of molds or by air blowing across said pair of molds.

15. The method according to claim 1, wherein said mold cavities are concave and convex.

16. An apparatus for the rapid, on-site making of a compression molded lens, comprising:

means for applying pressure to a preheated pair of molds mounted in a press, having no need for any type of gasketing means disposed about said pair of molds, with said molds having predetermined shaped cavities, positioned in said apparatus;

means for loading a monolithic preform of thermoplastic lens material on one of said molds; and said preform having radii for making a point or line contact with each of said molds so as to preclude the entrapment of air pockets and the formation of air bubbles in a formed lens;

means for pressing said molds toward each other and against said preform to a predetermined pressure value;

means for heating up said molds until said preform begins to soften and said predetermined pressure value drops off slightly;

means for continuing to heat up said pair of molds while maintaining said predetermined pressure value until said preform reaches a temperature at which said preform is fully compression molded into said lens by said predetermined shaped cavities of said pair of molds with any excess preform material exuded from between said pair of molds; and means for stopping said heating while maintaining pressure until said lens is cooled or until cool so as to handle said lens safely.

17. The apparatus according to claim 16, further including means for preheating said preform prior to loading said preform on one of said molds.

18. The apparatus according to claim 12, wherein said means for heating up said molds comprises radiation heating, either infrared or dielectric.

19. The apparatus according to claim 12, wherein said means for heating up said molds comprises fluid heating, either conductive or convective.

* * * * *